2,897,106
MOISTURE RESISTANT BRAZING ROD

William G. Morrison, Jr., Niagara Falls, N.Y., assignor to Union Carbide Corporation, a corporation of New York No Drawing. Application July 19, 1955
Serial No. 523,117

3 Claims. (Cl. 148—23)

This invention relates to flux coatings for brazing rods, and more particularly concerns an improved, substantially non-hygroscopic flux coating.

In rods having a conventional brazing flux coating composition containing for instance, anhydrous sodium tetraborate, boric acid and an organic binder, there is a tendency for the flux to absorb moisture from the surrounding air. This hygroscopic action may gradually cause rupturing of the flux bond and flaking of the flux from the rod. In addition, chemical reaction involving the metal of the rod may occur. Due to the nature of the above phenomena, the conventional flux-coated rods become objectionable in appearance and effectiveness. It is principally these objections which have created a need for a flux-coating which is similar in fluxing action to the conventional flux-coating composition, but which will resist the tendency to absorb moisture under changing humidity conditions.

It is, therefore, an important object of the present invention to provide an improved flux coating for a brazing rod, which is substantially non-hygroscopic and will contribute to the formation of strong welds at least to the same degree as conventional flux coating compositions.

The essence of the present invention resides in the incorporation in the fluxing composition of fluxing material, which when heated to brazing temperatures, will produce a sodium oxide to boric oxide ratio such as exists in conventional flux materials, and thus produce brazed joints which are equal to or superior to those obtained from conventional fluxing materials. Yet the fluxing composition of the present invention is comprised of non-hygroscopic materials, or materials which will minimize the tendency to take up moisture on storage. As a consequence, rods coated with the fluxing material of the invention will remain stable in appearance for periods of substantially longer duration than conventional flux-coated rods.

The object of the invention may be achieved by providing in a boric oxide-containing flux coating composition, an essentially non-hygroscopic hydrated salt, which under room temperature conditions will not tend to lose or gain water of hydration and which will produce approximately the same sodium oxide to boric oxide ratio present in conventional flux coatings. Studies of sodium tetraborate pentahydrate have shown it to be admirably suited as a non-hygroscopic fluxing ingredient. Accordingly, a flux coating embodying the principles of the invention may comprise the following ingredients in the following range of composition.

| | Percent |
|---|---|
| Sodium tetraborate pentahydrate | 16 to 20 |
| Boric acid | 56 to 60 |
| Binder | 20 to 28 |

Binders which may be used in the practice of the invention comprise any resinous or plastic binder, for example, methyl methacrylate.

Optimum moisture resistance is achieved when the flux components are in the following proportion:

| | Percent |
|---|---|
| Sodium tetraborate pentahydrate | 18 |
| Boric acid | 58 |
| Binder | 2 |

According to the present invention, the method of preparing the fluxing material bears an important relationship to the moisture resistance of the flux-coated rod when exposed to humid atmospheres. Preferably, the sodium tetraborate pentahydrate and the binder material should first be thoroughly mixed. Boric acid may then be admixed and uniformly dispersed throughout the mixture. This has the effect of protectively coating each particle of sodium tetraborate pentahydrate with the binder, and tends to prevent any reaction between the sodium tetraborate pentahydrate and the boric acid constituents in the presence of moisture prior to the brazing operation. Thereafter the flux composition may be applied as a coating to a brazing rod in the conventional manner.

Specific tests of the moisture resistance of coated brazing rods made in accordance with the above-described procedure were conducted under controlled conditions. In these tests both standard flux-coated brazing rods and flux-coated rods treated according to the present invention were stored in covered containers under conditions of varying humidity for periods up to 50 days. The humidity levels employed varied between 52 percent and 100 percent humidity. It was found that the surfaces of standard flux-coated rods became rough and puffed after being exposed for one day to humidities of 90 percent or above. Under similar conditions rods coated with the flux material of the present invention exhibited remarkable moisture resistance, the flux coating remaining substantially smooth and unaffected for at least 10 days. At humidity levels below 90 percent, the flux coatings of the invention were substantially unchanged. But the standard coatings showed evidence of being attacked by moisture at humidities as low as 66 percent after exposures of about three days.

Brazing rods coated with the fluxing material of the invention make excellent brazed joints, even after being exposed to 100 percent humidity conditions for short periods of time. In actual tests, brazed joints in cast iron were made using rods coated with the flux of the invention. Similarly coated rods were then exposed to 100 percent humidity and used in brazing. Comparison tests of the strength of these joints with joints formed from standard rod coatings were substantially of the same order of magnitude, the average tensile strength being about 24,700 p.s.i. which was the tensile strength of the cast iron.

From the above description it will be seen that brazing rods having flux coatings made in accordance with the present invention exhibit a higher degree of stability under varying humidity conditions than conventional flux-coated rods. Moreover the flux composition of the invention is effective in the formation of brazed joints which are comparable in strength to those produced with conventional fluxes.

Modifications and variations may be effected without departing from the scope of the novel concepts of the present invention.

What is claimed is:

1. A brazing flux coating composition for a brazing rod exhibiting high stability under changing humidity conditions, the composition consisting of 16% to 20% powdered sodium tetraborate pentahydrate, 56% to 60% boric acid, and 20% to 28% binder material, said binder material being so disposed as to substantially coat all the particles of sodium tetraborate pentahydrate to prevent premature chemical reaction between said sodium tetraborate pentahydrate and said boric acid in the presence of moisture prior to reaching fusion temperatures.

2. In the art of manufacturing a brazing flux coating composition for bronze rods, the method of imparting moisture resistance thereto comprising preparing a mixture of sodium tetraborate pentahydrate and binder material, coating each particle of sodium tetraborate pentahydrate with binder material by thoroughly mixing same until said sodium tetraborate pentahydrate particles are coated and thereafter admixing boric acid.

3. A brazing flux coating composition according to claim 1, said binder material being methyl methacrylate.

References Cited in the file of this patent

UNITED STATES PATENTS

| | | |
|---|---|---|
| 2,344,195 | Anthony et al. | Mar. 14, 1944 |
| 2,478,944 | Rising | Aug. 16, 1949 |
| 2,642,516 | Avery | June 16, 1953 |
| 2,658,013 | Hannahs | Nov. 3, 1953 |
| 2,684,312 | Wasserman | July 20, 1954 |

OTHER REFERENCES

Uses and Applications of Chemicals and Related Materials, page 111, Gregory, 1939.